(12) United States Patent  
Naruse

(10) Patent No.: US 9,367,269 B2
(45) Date of Patent: Jun. 14, 2016

(54) PRINTING APPARATUS AND WIRELESS COMMUNICATION METHOD TO IMPLEMENT CHARGING CONTROL FOR PRINTING A PRINT DATA TRANSMITTED BY A COMMUNICATION TERMINAL

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/305,395

(22) Filed: Jun. 16, 2014

(65) Prior Publication Data

US 2015/0002879 A1 Jan. 1, 2015

(30) Foreign Application Priority Data

Jun. 28, 2013 (JP) ................................. 2013-137478

(51) Int. Cl.
*G06F 3/12* (2006.01)
*G03G 21/02* (2006.01)
*G03G 15/00* (2006.01)

(52) U.S. Cl.
CPC .......... *G06F 3/1222* (2013.01); *G03G 15/5016* (2013.01); *G03G 15/5091* (2013.01); *G03G 21/02* (2013.01); *G06F 3/1238* (2013.01); *G06F 3/1267* (2013.01); *G06F 3/1292* (2013.01); *G06F 2206/1504* (2013.01)

(58) Field of Classification Search
None
See application file for complete search history.

(56) References Cited

U.S. PATENT DOCUMENTS

| 2005/0078337 | A1* | 4/2005 | Ichikawa et al. | 358/1.15 |
|---|---|---|---|---|
| 2011/0292445 | A1* | 12/2011 | Kato | 358/1.15 |
| 2012/0147420 | A1* | 6/2012 | Nishimi et al. | 358/1.15 |
| 2013/0229673 | A1 | 9/2013 | Nakayama et al. | 358/1.13 |
| 2013/0229685 | A1 | 9/2013 | Naruse | 358/1.15 |
| 2013/0231051 | A1 | 9/2013 | Naruse | 455/41.2 |

FOREIGN PATENT DOCUMENTS

| JP | 2006-048270 A | 2/2006 |
|---|---|---|
| JP | 2007-140990 A | 6/2007 |
| JP | 2007-166538 A | 6/2007 |

OTHER PUBLICATIONS

U.S. Appl. No. 14/304,376, filed Jun. 13, 2014.

* cited by examiner

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

This invention provides a technique capable of appropriately executing, for a communication terminal apparatus, charging processing for printing. When a printing apparatus detects a communication terminal, if the ID information of the communication terminal matches ID information corresponding to a communication terminal which has transmitted print target data, the printing apparatus executes charging processing for printing of the print target data, and print processing for the print target data.

20 Claims, 14 Drawing Sheets

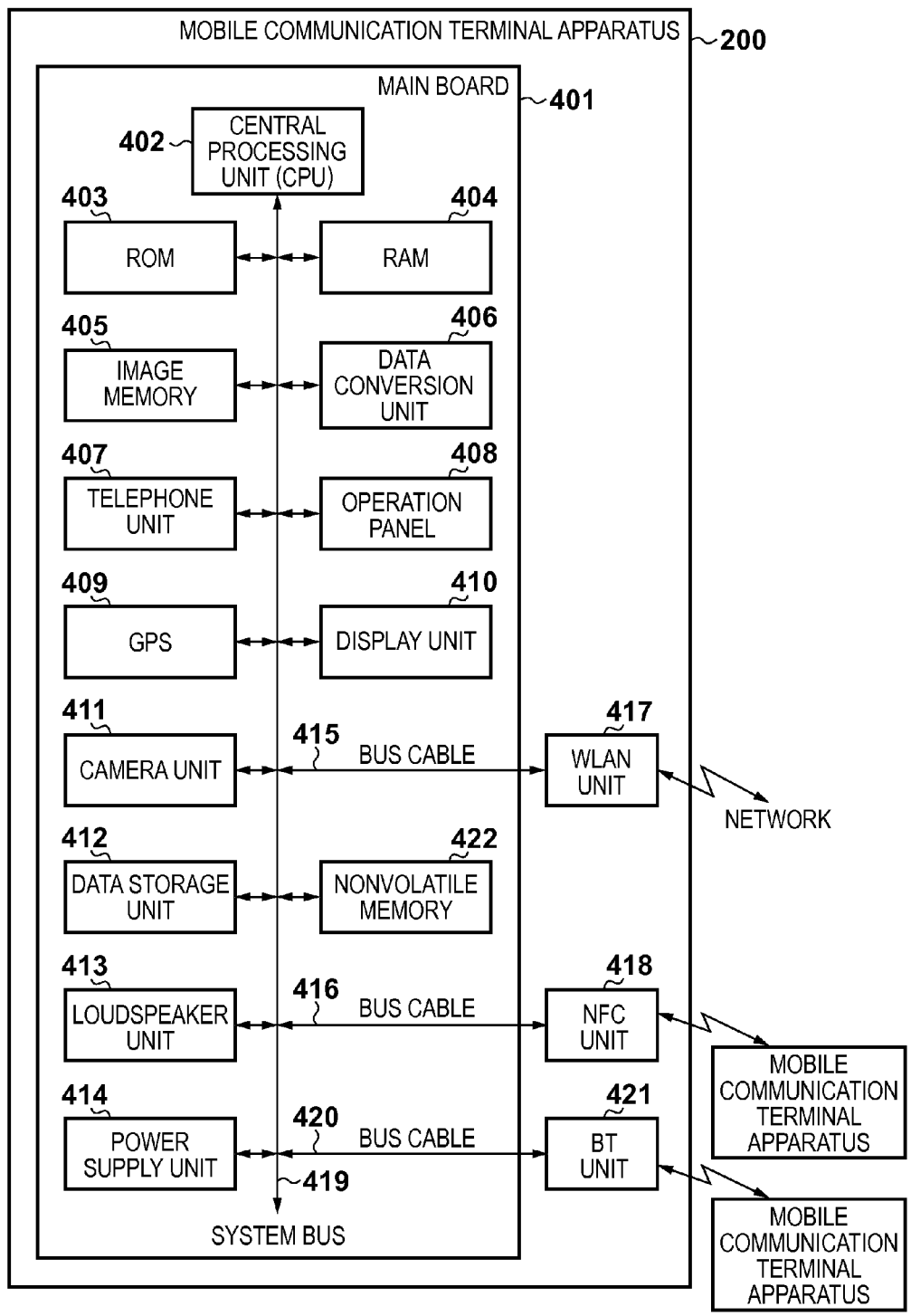

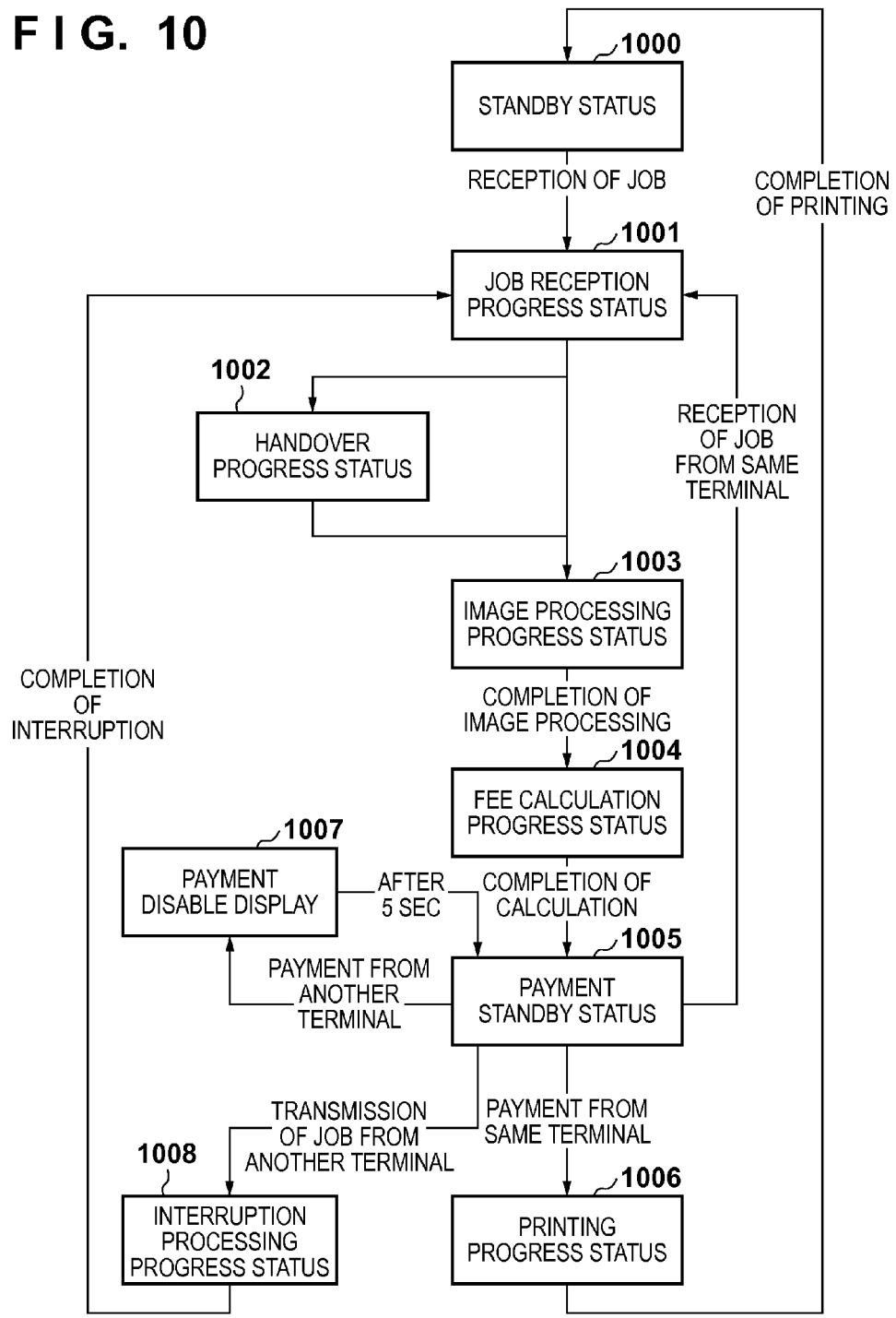

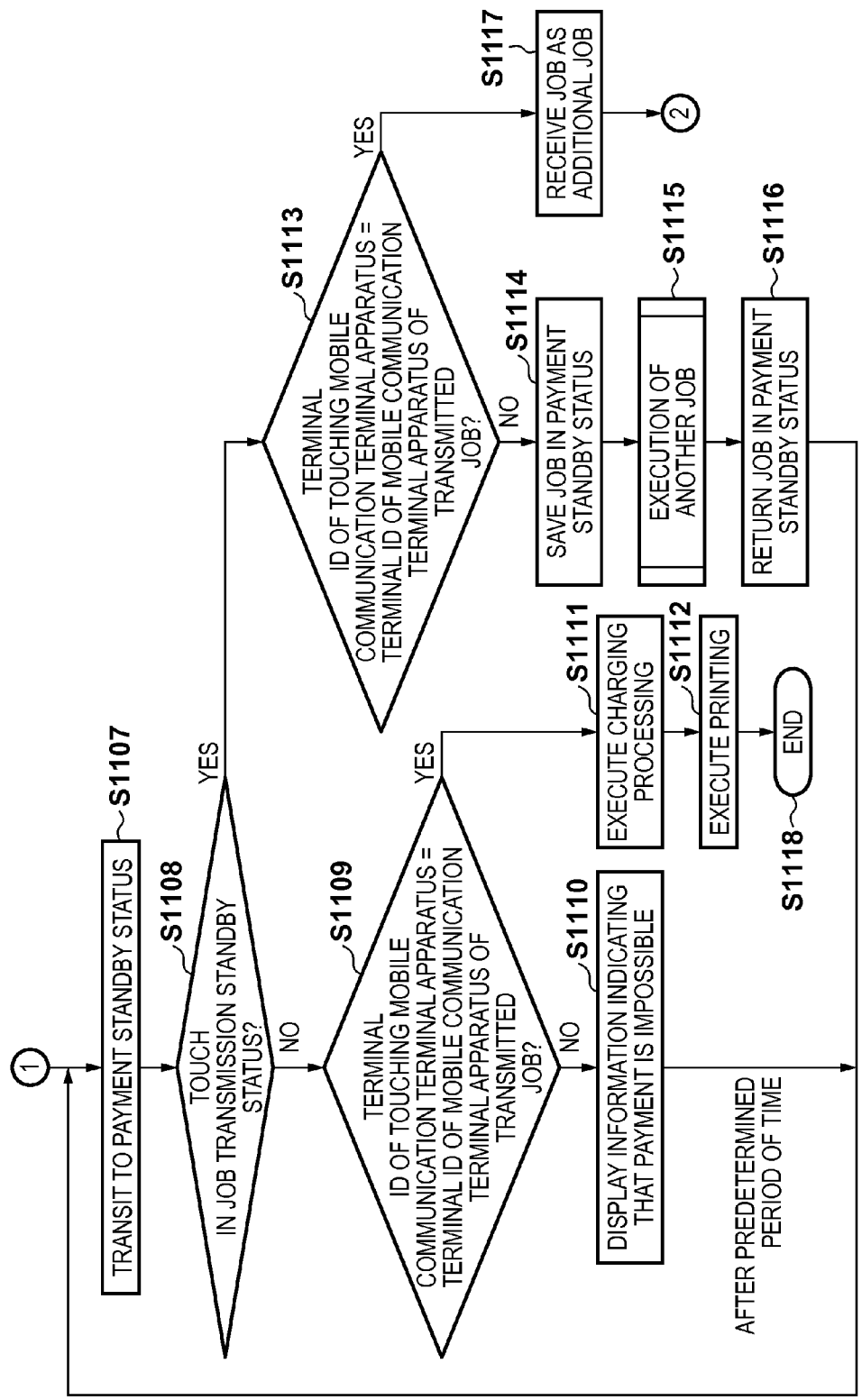

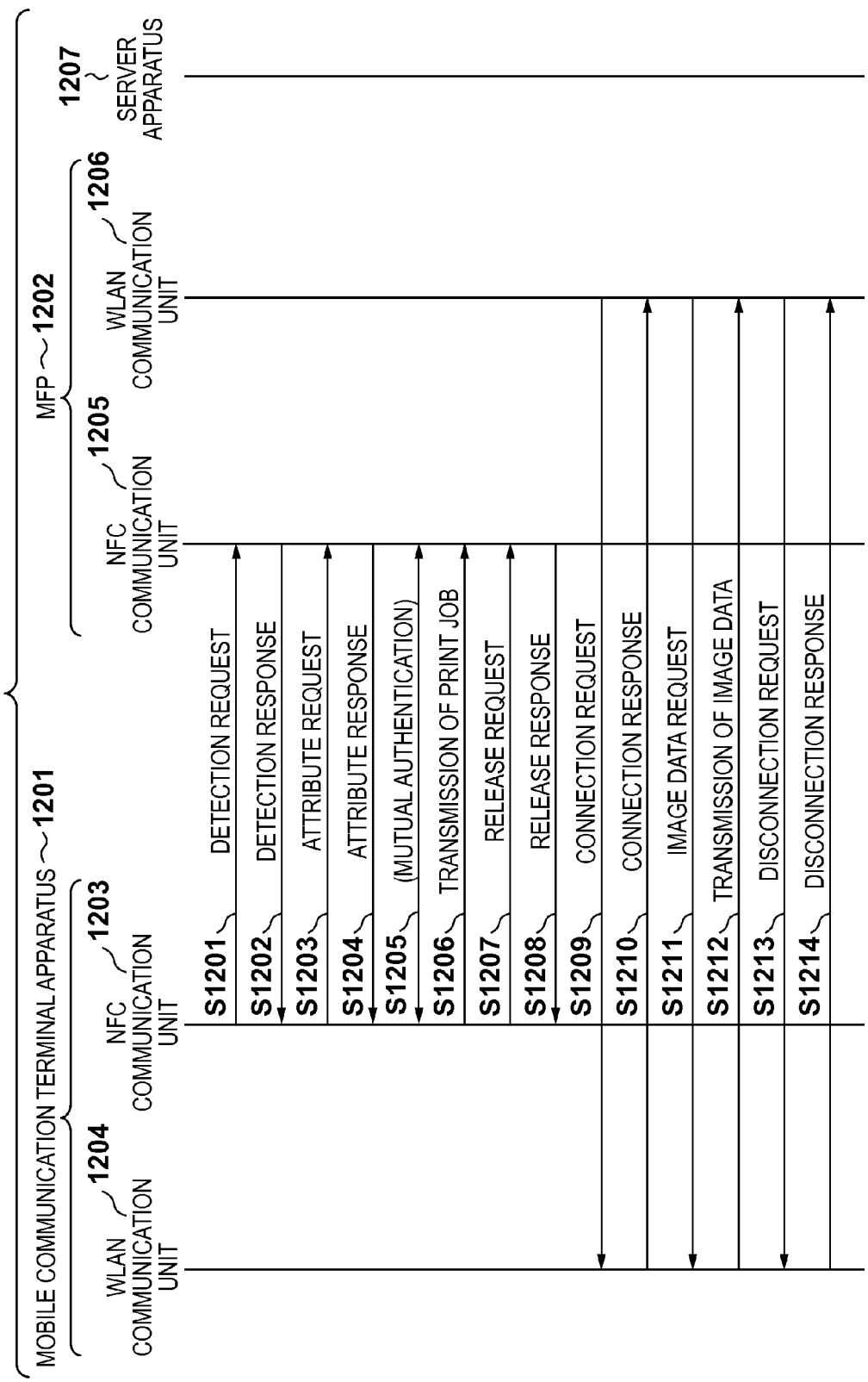

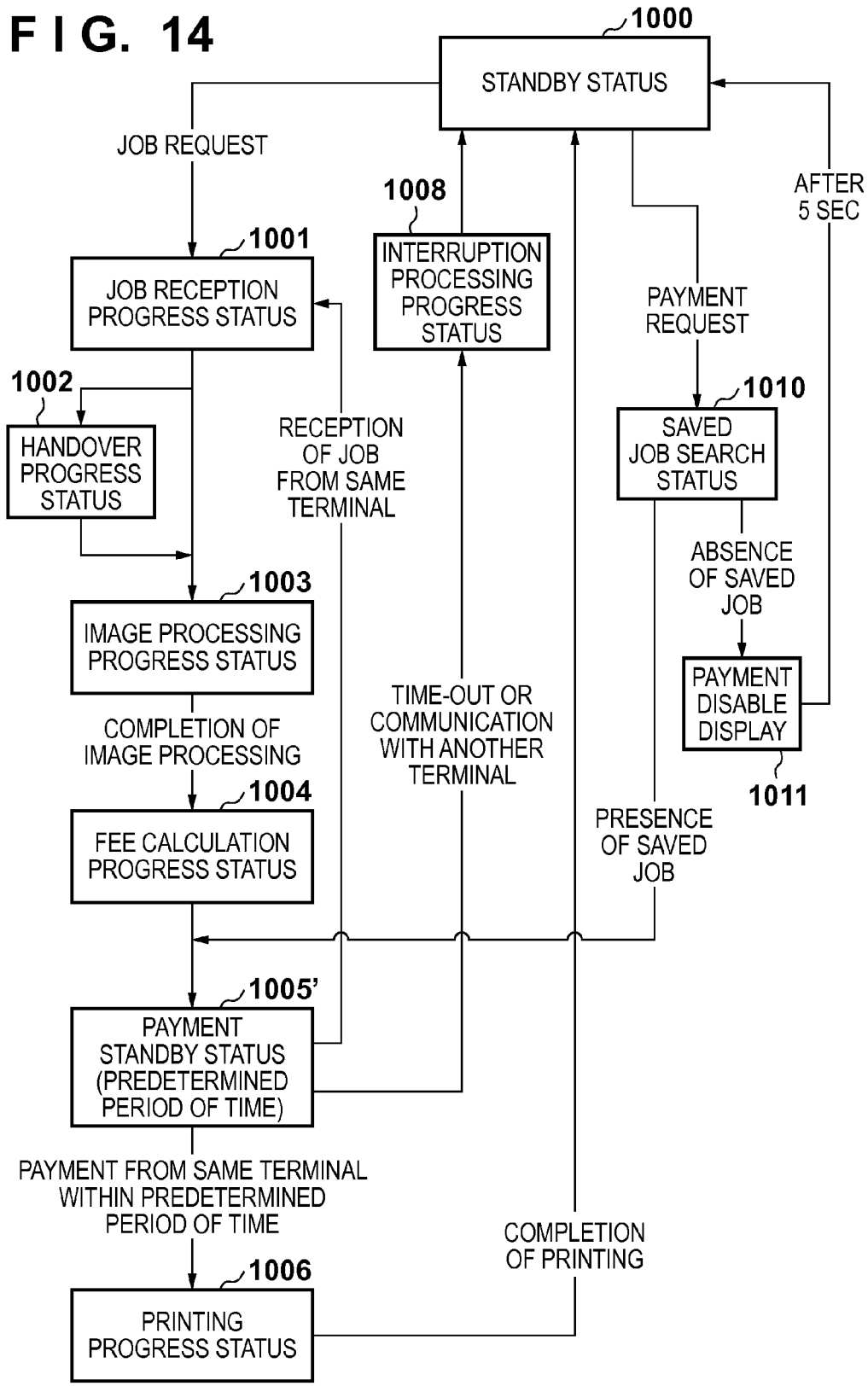

PRINTING APPARATUS AND WIRELESS COMMUNICATION METHOD TO IMPLEMENT CHARGING CONTROL FOR PRINTING A PRINT DATA TRANSMITTED BY A COMMUNICATION TERMINAL

BACKGROUND OF THE INVENTION

1. Field of the Invention

The present invention relates to a printing control apparatus and a communication method and, more particularly, to charging control for printing of print target data transmitted by a communication terminal.

2. Description of the Related Art

Conventionally, there is known a technique of paying a fee for printing executed by a printing device by general-purpose electronic money stored in an IC card or the like (Japanese Patent Laid-Open No. 2007-140990 to be referred to as patent literature 1 hereinafter). In a value collection system disclosed in patent literature 1, a print job transmitted by a terminal is printed after a printing device charges for the print job using general-purpose electronic money. In this system, an information terminal such as a PC transmits a print job, and another IC card is used to charge for the print job. In recent years, there is also known a technique of incorporating the mechanism of general-purpose electronic money of an IC card in a mobile communication terminal apparatus (Japanese Patent Laid-Open No. 2006-48270 to be referred to as patent literature 2 hereinafter).

As another technique, there is known a technique of performing high-speed data transfer using a mobile communication terminal apparatus. This technique is known to perform short distance wireless communication in addition to conventional communication via a communication network. A partner communication apparatus of short distance wireless communication is, for example, an MFP (Multi Function Printer), which is known to transmit and receive image data and the like. By using the above described mechanism of general-purpose electronic money of an IC card and a mechanism of transmitting and receiving image data and the like using a mobile communication terminal apparatus, it is possible to complete processing from transmission of a print job to payment using one mobile communication terminal apparatus.

Furthermore, to implement efficient communication in terms of the communication speed and operability, it is known to perform short distance wireless communication using two types of communication methods. There has been proposed a technique in which information of a communication target apparatus necessary for the second short distance wireless communication method is transmitted and received by the first short distance wireless communication method with which the communication speed is relatively low and it is possible to reliably specify a communication partner, and high-speed communication is performed by the second short distance wireless communication method using the information (Japanese Patent Laid-Open No. 2007-166538 to be referred to as patent literature 3 hereinafter).

The first short distance wireless communication method is, for example, NFC (Near Field Communication), and the second short distance wireless communication method is, for example, Bluetooth® or wireless LAN. Patent literature 1 proposes a printer which first transmits the communication method and encryption method of next communication by NFC and, when communication is to be switched, switches the communication to execute printing using the second communication method. Processing of performing pairing by the first short distance wireless communication method and then switching the communication to the second short distance wireless communication method will be referred to as a handover hereinafter.

When the above-described apparatus which can complete processing from transmission of a print job to a printing apparatus to payment by using one mobile communication terminal apparatus is used, the following problem arises. At the time of transmission of a print job from a mobile communication terminal apparatus, a printing apparatus cannot detect the number of printing sheets and a color mode (monochrome or color) necessary for printing, and thus a fee necessary for printing may not be confirmed. It is, therefore, necessary to perform communication for transmitting a print job and communication for charging.

Even if, for example, a mobile communication terminal apparatus generates a print job of five pages using a printing application, it is not always guaranteed depending on image processing of a printing apparatus that five pages are printed, and six pages may be printed. The difference between the printing application and the image processing program of the printing apparatus may change the number of printing sheets. In this case, the print job designates printing of five pages but it is necessary to charge for six pages. As another example, the printing apparatus forcibly changes settings. If, for example, the printing apparatus is set in an ecology mode to save printing sheets, the job setting of the user may be changed to "2in1" (a mode in which two pages are printed on one printing sheet). As still another example, the mobile communication terminal apparatus transmits a print job of color printing but the printing apparatus changes the setting to monochrome printing since it has no color inks. As still another example, although the mobile communication terminal apparatus transmits a print job of wood-free paper, the printing apparatus executes printing by changing the setting to plain paper. As still another example, if the printing apparatus side temporarily changes a charging unit, an actual fee is different from a fee quoted on the mobile communication terminal apparatus side.

For these reasons, when charging for a print job, it may be impossible to quote an accurate fee unless the printing apparatus performs processing such as image processing after a print job is transmitted. It is, therefore, necessary to separately perform communication for transmitting a print job and communication for payment.

For example, however, if a printing apparatus in a store or the like is used, the user may leave the printing apparatus during a period from when he/she transmits a print job to the printing apparatus until a fee to be charged is decided. The probability that such situation occurs increases especially for an image for which it takes time to execute image processing. In this case, when a third party other than the user who has transmitted the job completes charging processing using general-purpose electronic money, printing starts, and thus printing materials may be carried away.

SUMMARY OF THE INVENTION

The present invention provides a technique capable of appropriately executing, for a communication terminal apparatus, charging processing for printing.

To achieve this object, for example, the present invention in a first aspect provides a printing control apparatus for controlling a communication unit and a printing unit to perform short distance wireless communication, and controlling printing of data which has been requested by a communication terminal via the communication unit, comprising: a reception unit configured to receive ID information for specifying the communication terminal or a user of the communication terminal from the communication terminal via the communication unit; a transition unit configured to perform, in a case where the reception unit receives the ID information, transition to a communication standby status for predetermined processing for the printing of the print target data which has been requested by the communication terminal via the communication unit; and an execution unit configured to execute, in a case where a communication terminal is detected via the communication unit in the communication standby status by the transition unit, and ID information of the communication terminal corresponds to the ID information received by the reception unit, the predetermined processing for the printing of the print target data.

The present invention in a second aspect provides a communication method for a communication terminal and a printing apparatus by wireless communication, comprising: a reception step of causing the printing apparatus to receive ID information for specifying the communication terminal or a user of the communication terminal from the communication terminal; a transition step of causing the printing apparatus to perform, in a case where the ID information is received in the reception step, transition to a communication standby status for predetermined processing for printing which the communication terminal has requested the printing apparatus to execute; and an execution step of causing the printing apparatus to execute, in a case where the printing apparatus detects a communication terminal in the communication standby status in the transition step, and ID information of the communication terminal corresponds to the ID information received in the reception step, the predetermined processing for printing of print target data.

According to the present invention, it is possible to appropriately execute, for a communication terminal apparatus, charging processing for printing.

Further features of the present invention will become apparent from the following description of exemplary embodiments (with reference to the attached drawings).

BRIEF DESCRIPTION OF THE DRAWINGS

FIG. 4 is a block diagram showing the arrangement of the mobile communication terminal apparatus;

FIG. 10 is a view showing status transition with respect to charging of the MFP;

FIGS. 11A and 11B are flowcharts illustrating a sequence from when the mobile communication terminal apparatus transmits a job and the MFP charges for the job until printing is completed;

FIG. 12 is a sequence chart showing processing in which the mobile communication terminal apparatus transmits a job to the MFP and the MFP connects to the mobile communication terminal apparatus by a handover;

FIG. 14 is a view showing status transition with respect to charging of an MFP according to the second embodiment.

DESCRIPTION OF THE EMBODIMENTS

Figure 1:
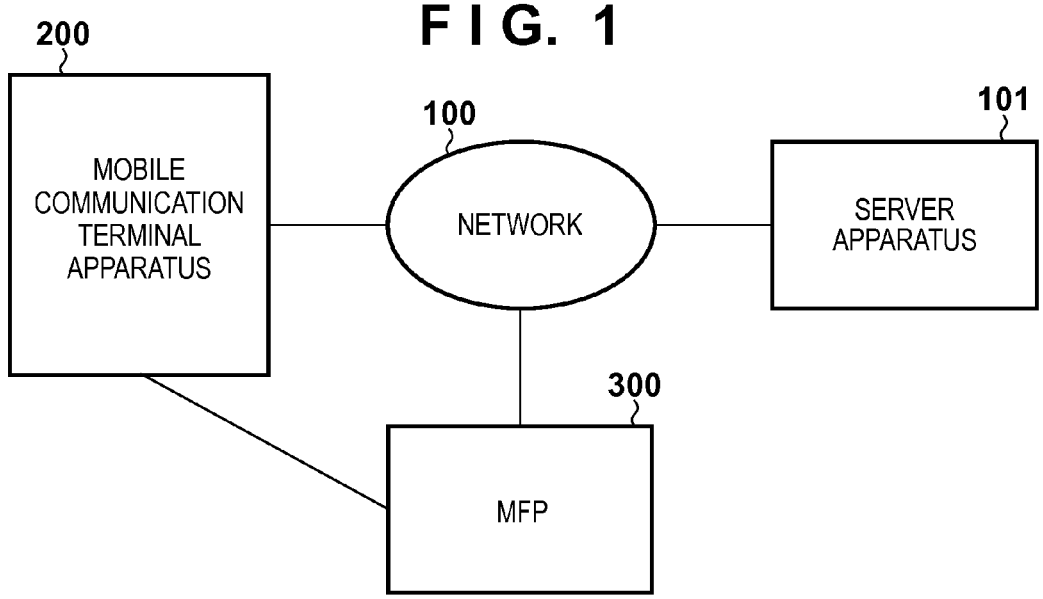
FIG. 1 is a view showing an example of the configuration of a wireless communication system.

Embodiments of the present invention will be exemplarily described in detail below with reference to the accompanying drawings. Note that the relative arrangement of components, display screens, and the like set forth in the embodiments do not intend to limit the scope of the invention to them, unless otherwise specified.

First Embodiment

This embodiment has as its object to decrease the probability that a third party carries printing materials away against a user's intention when transmission of a job and charging processing are sequentially performed using a mobile communication terminal apparatus (mobile terminal). Especially when a job is transmitted using a handover, job information is first sent by first short distance wireless communication at a relatively low speed. Since the communication is switched to high-speed second short distance wireless communication after that, it probably takes more time than in a case in which a job is directly transmitted. This results in higher probability that the user leaves a printing apparatus. Therefore, the above object is important.

It is assumed that the user wants to additionally transmit a job immediately after he/she transmits a job using the mobile communication terminal apparatus. In this case, it is efficient to collectively charge for the jobs later. To achieve this, the embodiment has as its object to improve the user convenience by accepting an additional job during a charging standby status after transmitting a job using the mobile communication terminal apparatus.

During the charging standby status as described above, if the user forgets to pay a fee and leaves, the next user may not be able to transmit a job, or charging processing for the previous user may be erroneously performed for the next user. To solve this problem, the embodiment has as its object to allow the next user to execute a job without charging the next user for the job of the previous user even if the printing apparatus is left in the charging standby status.

In addition, the embodiment has as its object to allow a job of the initial user to be re-executed even if a job of another user is executed after the printing apparatus is left in the charging standby status as described above.

When making payment of the mobile communication terminal apparatus in the charging standby status as described above, if charging of general-purpose money of the IC card responds, the user cannot add a job and printing starts although the user intends to additionally transmit a job. The embodiment has as its object to allow the user to add a job instead of making payment when he/she intentionally transmits a job.

In this embodiment, printing sequence control and charging sequence control when a job is transmitted using the mobile communication terminal apparatus and a fee is charged after a multi-function printer (to be referred to as an MFP hereinafter) executes image processing will be described below. A case will be exemplified in which a low-speed communication unit performs authentication using a short distance wireless communication method especially when transmitting a job, and printing data is then transmitted by switching the communication unit to a high-speed communication unit of wireless communication. More specifically, a printing method using a handover technique of performing authentication by communication such as NFC (Near Field Communication) using short distance noncontact electromagnetic induction method, and handing over the communication to wireless communication of another communication method will be explained. In this embodiment, the handover technique is used. However, when transmitting the first job, job data may also be transmitted without using the handover technique.

FIG. 1 of this embodiment is a view showing the configuration of a printing payment system formed by a wireless communication system. A server apparatus 101, a mobile communication terminal apparatus 200, and an MFP 300 are connected to each other centered on a network 100. The server apparatus 101 is configured by a storage for storing image data to be printed and applications for managing of user ID information and for image processing. The mobile communication terminal apparatus 200 is an apparatus including at least two or more wireless communication units whose authentication methods and communication speeds are different from each other. Practical examples of the mobile communication terminal apparatus 200 are a personal information terminal such as a PDA (Personal Digital Assistant), a mobile phone, a digital camera, and a smartphone. However, the mobile communication terminal apparatus 200 may be any apparatus which can process a file to be printed. The MFP 300 has a reading function for reading a document placed on a document table, and a printing function using a printing unit such as an inkjet printer, and may additionally have a facsimile function and telephone function. The network 100 and the server apparatus 101 are connected via a wired LAN. The network 100 and the MFP 300 are connected via a wired LAN or a wireless LAN (to be referred to as a WLAN hereinafter). The network 100 and the mobile communication terminal apparatus 200 are connected via a WLAN. Since both the mobile communication terminal apparatus 200 and the MFP 300 have a WLAN function, they can perform peer-to-peer (to be referred to as P2P hereinafter) communication by executing mutual authentication.

Figure 2:
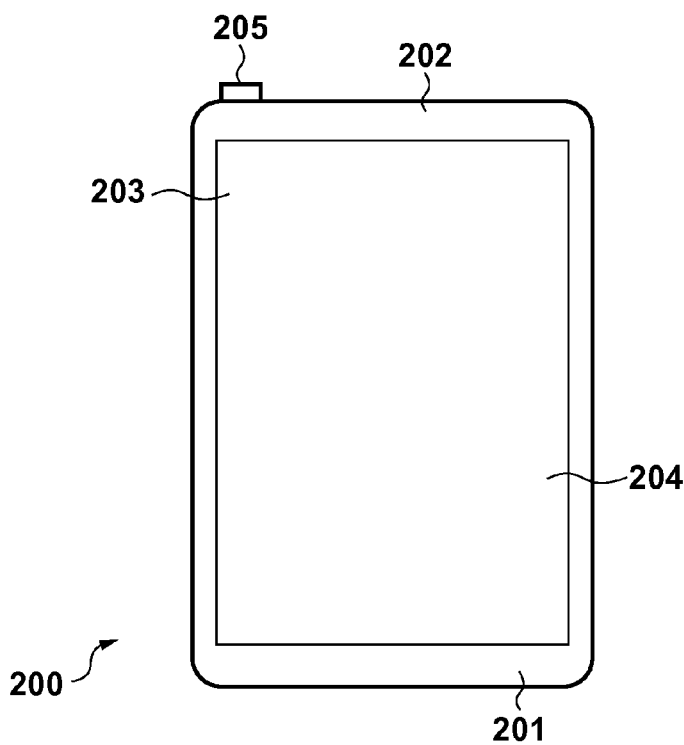
FIG. 2 is a view showing the outer appearance of a mobile communication terminal apparatus.

FIG. 2 is a view showing the outer appearance of the mobile communication terminal apparatus 200. In this embodiment, a smartphone will be exemplified. The smartphone indicates a multi-function mobile phone which incorporates a camera, network browser, email function, and the like in addition to functions of a mobile phone. An NFC unit 201 is a portion for performing communication using NFC. When the user actually brings the NFC unit 201 closer to a partner NFC unit within about 10 cm to touch the partner NFC unit, the NFC units can communicate with each other. A WLAN unit 202 is a unit used to perform communication via a WLAN, and is arranged within the apparatus. A display unit 203 is a display having an LCD display mechanism. An operation panel 204 includes a touch-panel operation mechanism, and detects pressing information of the user. As a representative operation method, the display unit 203 displays buttons, and the user presses the operation panel 204, thus issuing a button pressing event. A power key 205 is used to turn on/off the power.

Figure 3A:
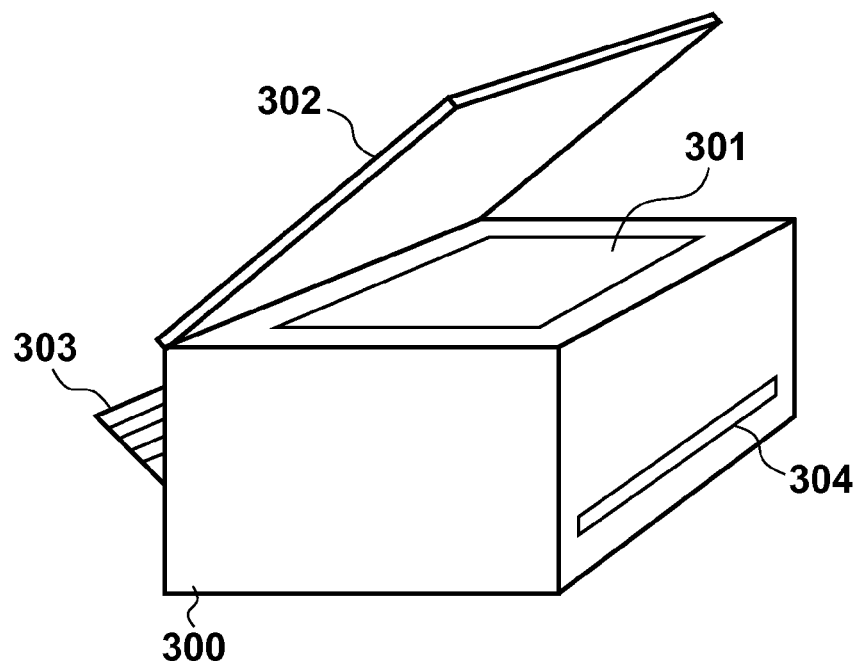
FIG. 3A is a perspective view showing the outer appearance of an MFP.
Figure 3B:
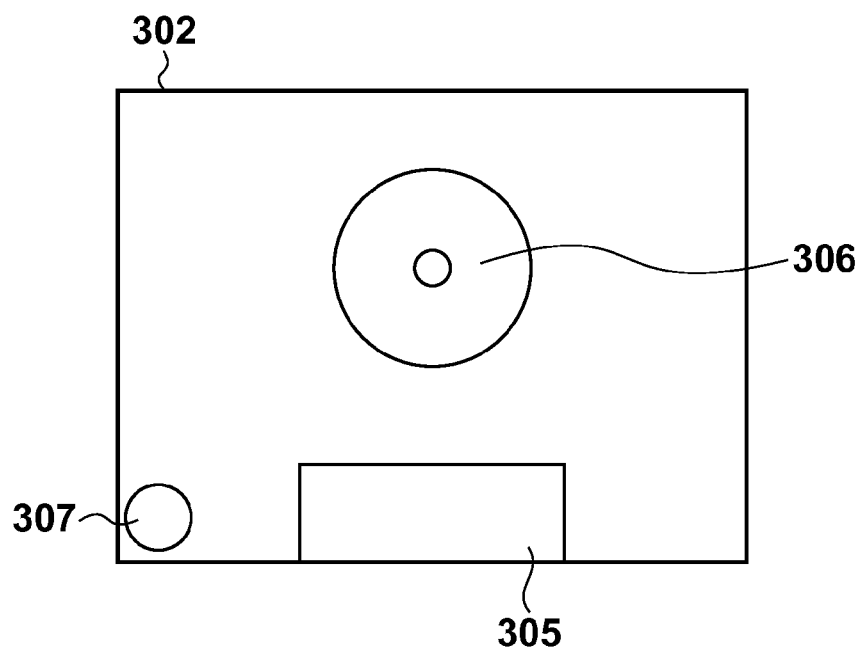
FIG. 3B is a plan view showing the MFP.

FIG. 3A is a perspective view showing the outer appearance of the MFP. FIG. 3B is a plan view. A document table 301 is a glass-like transparent table which is used to read a document placed on it by a scanner. A document cover 302 is a cover used to prevent reading light from externally leaking at the time of reading by the scanner. A printing paper insertion port 303 is an insertion port on which paper sheets of various sizes are set. Paper sheets set on the printing paper insertion port 303 are conveyed one by one to the printing unit, and are discharged from a printing paper discharge port 304 after desired printing is performed. An operation display unit 305 and an NFC unit 306 are arranged on the upper portion of the document cover 302. The operation display unit 305 includes physical keys such as a 4-way selector and start key, and an LCD display unit. The NFC unit 306 is a unit used to perform short distance wireless communication, and is a place where the apparatus is actually moved closer to touch the MFP. A distance of about 10 cm from the NFC unit 306 is an effective distance of contact. A WLAN antenna 307 is an antenna which is used to perform WLAN communication, and is embedded in the MFP.

FIG. 4 is a block diagram showing the mobile communication terminal apparatus 200. The mobile communication terminal apparatus 200 includes a main board 401 for executing main control of the apparatus, a WLAN unit 417 for performing WLAN communication, an NFC unit 418 for performing NFC communication, and a BT unit 421 for performing Bluetooth® communication.

In the main board 401, a CPU 402 is a system control unit, and controls the overall mobile communication terminal apparatus 200. A ROM 403 stores control programs to be executed by the CPU 402, an embedded operating system (OS) program, and the like. In this embodiment, the respective control programs stored in the ROM 403 execute software control such as scheduling and task switching under the management of the embedded OS stored in the ROM 403.

A RAM 404 is implemented by an SRAM (Static RAM) or the like, stores program control variables and the like, also stores setting values registered by the user, management data of the mobile communication terminal apparatus 200, and the like, and is allocated with various work buffer areas.

An image memory 405 is implemented by a DRAM (Dynamic RAM) or the like, and temporarily stores image data received via a communication unit and those read out from a data storage unit 412 so as to be processed by the CPU 402. A nonvolatile memory 422 is implemented by a flash memory or the like, and stores data to be saved even after power-off. Data used for charging are saved in the nonvolatile memory 422. Charging processing is performed according to a charging system, and a given fee is held in the mobile communication terminal apparatus 200 using a dedicated application. When using the apparatus, the user pays a predetermined fee using the NFC unit 418. In addition, address book data and the like are stored. Note that the memory structure is not limited to this. For example, the image memory 405 and the RAM 404 may share a memory, or data may be backed up in the data storage unit 412. In this embodiment, a DRAM is used as the image memory 405. However, the present invention is not limited to this since a hard disk, a nonvolatile memory, or the like may be used.

A data conversion unit 406 executes analysis of a page description language (PDL) and the like, and data conversion such as color conversion and image conversion. A telephone unit 407 controls a telephone line, and implements telephone communication by processing audio data input/output via a loudspeaker unit 413. An operation panel 408 controls signals of the operation panel 204 described with reference to FIG. 2. A GPS (Global Positioning System) 409 acquires the current latitude and longitude, and the like. A display unit 410 electronically controls the display contents of the display unit 203 described with reference to FIG. 2, allows various input operations, and can display operation states, status conditions, and the like of the MFP 300.

A camera unit 411 has a function of electronically recording and encoding an image input via a lens. An image captured by the camera unit 411 is saved in the data storage unit 412. The loudspeaker unit 413 implements a function of inputting or outputting a speech for a telephone function, and also an alarm notification function and the like. A power supply unit 414 is a portable battery, and controls the portable battery. A power supply status includes a battery dead status in which the battery has no remaining amount, a power-off status in which the power key 205 is not pressed, an activation status in which the apparatus is normally active, and a power saving status in which the apparatus is active but is set in a power saving mode.

In this embodiment, the mobile communication terminal apparatus 200 incorporates three arrangements each used to perform wireless communication. The arrangements can be used to perform wireless communication by WLAN, NFC, and Bluetooth®, respectively. Each communication unit performs data communication with another device such as an MFP. Each communication unit converts data into packets, and transmits the packets to the other device. Conversely, each communication unit converts packets coming from another external device into data, and transmits the data to the CPU 402. In this embodiment, NFC is used to send connection information for a handover, transmit a job, and exchange charging information. WLAN and Bluetooth are used as high-speed communication units for transmitting/receiving job data by taking over the connection from NFC by a handover. The WLAN unit 417, NFC unit 418, and BT unit 421 are connected via bus cables, respectively. The WLAN unit 417, NFC unit 418, and BT unit 421 are units each used to implement communication complying with its standard. The NFC unit will be described in detail later with reference to FIG. 6.

The above-described components 403 to 414, 417, 418, 421, and 422 are connected to each other via a system bus 419 managed by the CPU 402.

Figure 5:
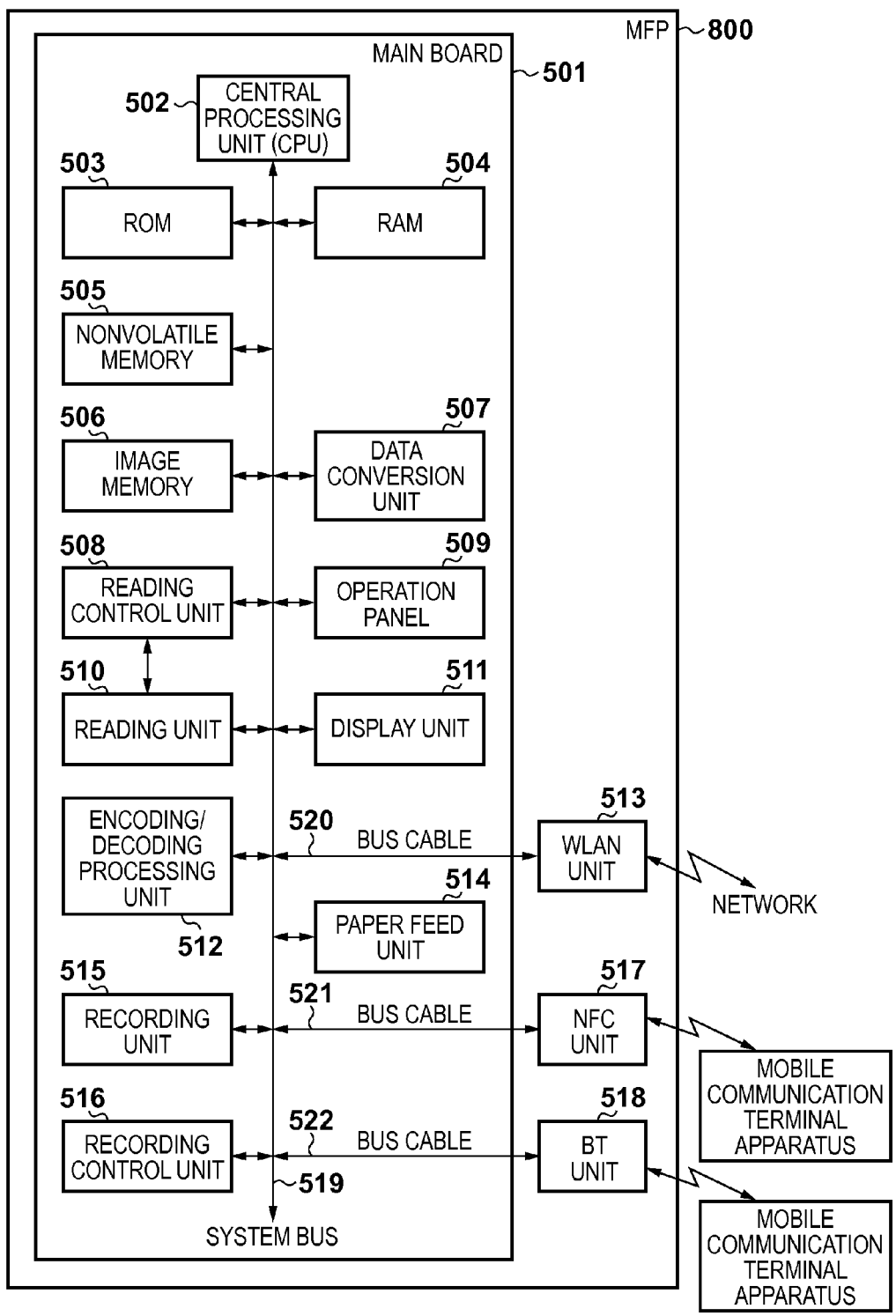
FIG. 5 is a block diagram showing the arrangement of the MFP.

FIG. 5 is a block diagram showing the schematic arrangement of the MFP 300. The MFP 300 includes a main board 501 for executing main control of the apparatus, a WLAN unit 513 for performing WLAN communication, an NFC unit 517 for performing NFC communication, and a BT unit 518 for performing Bluetooth communication.

In the main board 501, a CPU 502 is a system control unit, and controls the overall MFP 300. A ROM 503 stores control programs to be executed by the CPU 502, an embedded operating system (OS) program, and the like. In this embodiment, the respective control programs stored in the ROM 503 perform software control such as scheduling and task switching under the management of the embedded OS stored in the ROM 503. Some of the control programs execute charging control to exchange control commands for charging with the mobile communication terminal apparatus 200 using the NFC unit 517.

A RAM 504 is implemented by an SRAM (Static RAM) or the like, stores program control variables and the like, also stores setting values registered by the user, management data of the MFP 300, and the like, and is allocated with various work buffer areas. A nonvolatile memory 505 is implemented by a flash memory or the like, and stores data to be held even after power-off. More specifically, such data include network connection information and user data. An image memory 506 is implemented by a DRAM (Dynamic RAM) or the like, and stores image data received via each communication unit, and those processed by an encoding/decoding processing unit 512. Also, the memory structure is not limited to this, similarly to the memory structure of the mobile communication terminal apparatus 200. A data conversion unit 507 executes analysis of a page description language (PDL) and the like, conversion from image data into print data, and the like. It may take time to process the PDL depending on a description method, and it is not uncommon to take several ten sec to several min to process a print job of a large number of pages.

A reading control unit 508 will be explained. A reading unit 510 optically reads a document by a CIS image sensor (contact type image sensor). Next, various kinds of image processing such as binarization processing and halftone processing are performed, via an image processing control unit (not shown), for an image signal obtained by converting the read document into electrical image data, thereby outputting high-resolution image data.

An operation panel 509 and a display unit 511 are formed from keys operated by the user, and an LCD for displaying data.

The encoding/decoding processing unit 512 executes encoding/decoding processing and enlargement/reduction processing for image data (JPEG, PNG, or the like) handled by the MFP 300.

A paper feed unit 514 is a portion capable of holding paper sheets for printing. A paper sheet can be fed from the paper feed unit 514 under the control of a recording control unit 516. Especially, as the paper feed unit, a plurality of paper feed units can be prepared so as to hold a plurality of types of paper sheets in one apparatus. Then, the recording control unit 516 can control to select a paper feed unit to be used to feed paper sheets.

The recording control unit 516 performs, via the image processing control unit (not shown), various kinds of image processing such as smoothing processing, recording density correction processing, and color correction for image data to be printed, and converts the image data into high-resolution image data, thereby outputting the obtained image data to a recording unit 515. The recording control unit 516 also serves to periodically read out information of the recording unit, and update information in the RAM 504. More specifically, the recording control unit 516 updates the remaining amount of an ink tank, a printhead status, and the like. The MFP 300 also incorporates three units each used to perform wireless communication, similarly to the mobile communication terminal apparatus 200, and a description of these units will be omitted since their functions are the same. The above-described components 502 to 516 are connected to each other via a system bus 519 managed by the CPU 502.

Figure 6:
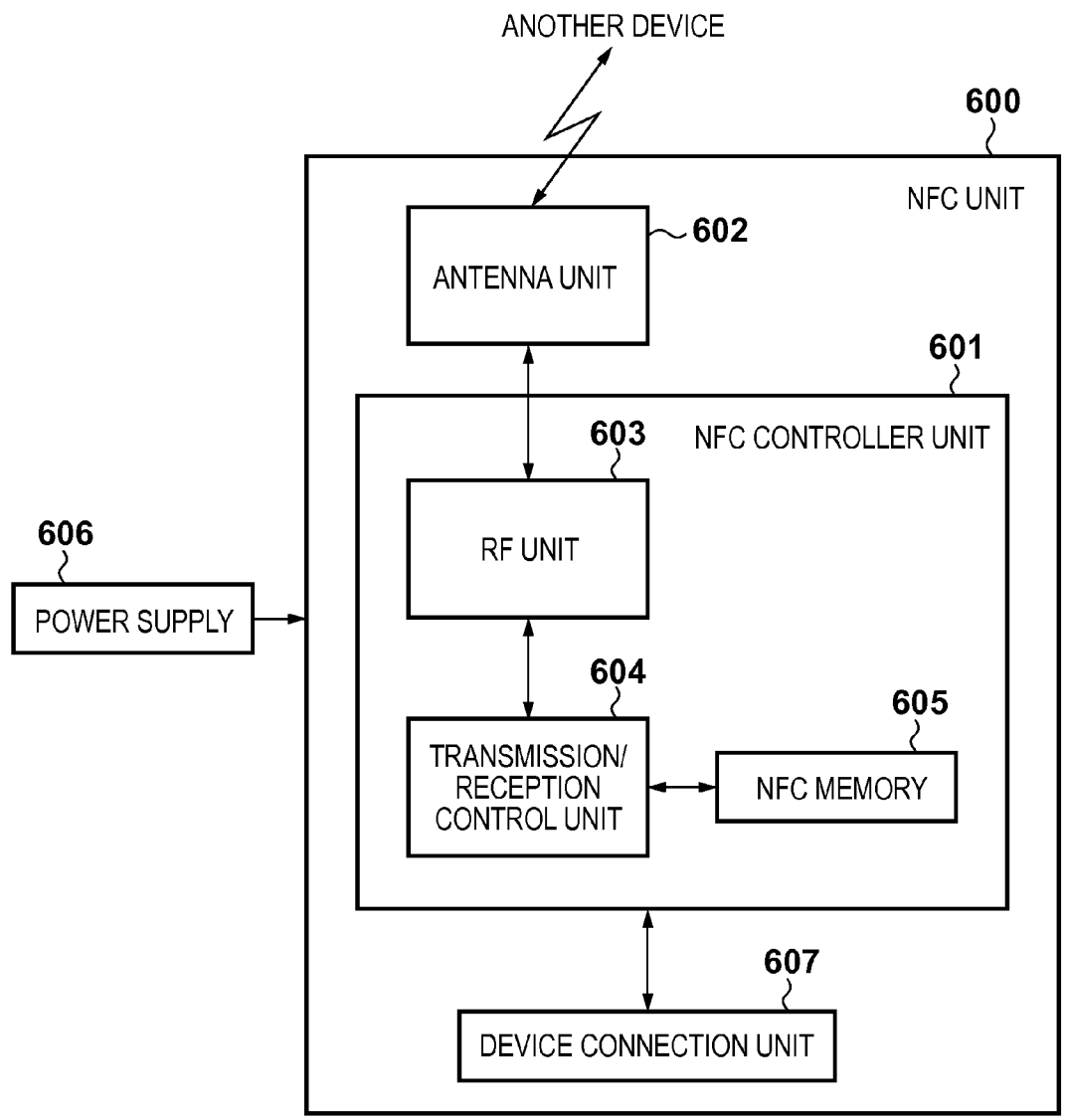
FIG. 6 is a block diagram showing the arrangement of an NFC unit.

FIG. 6 is a block diagram for explaining details of an NFC unit used as the NFC unit 418 or 517. Prior to a description of FIG. 6, NFC communication will be explained. For short distance communication using an NFC unit, an apparatus which outputs an RF (Radio Frequency) field to start communication will be referred to as an initiator hereinafter. An apparatus which communicates with the initiator in response to an instruction issued by the initiator will be referred to as a target hereinafter.

A passive mode and an active mode will now be described. The communication mode of the NFC unit includes a passive mode and active mode. In the passive mode, a target responds to an instruction of an initiator by performing load modulation. It is, therefore, unnecessary to supply power to the target. On the other hand, in the active mode, a target responds to an instruction of an initiator by an RF field generated by the target itself. It is, therefore, necessary to supply power to the target. The active mode has as its feature a communication speed higher than that in the passive mode.

The arrangement of an NFC unit 600 shown in FIG. 6 will be described. The NFC unit 600 includes an NFC controller unit 601, an antenna unit 602, an RF unit 603, a transmission/reception control unit 604, an NFC memory 605, a power supply 606, and a device connecting unit 607. The antenna unit 602 receives radio waves and carriers from another NFC device, and transmits radio waves and carriers to another NFC device. The RF unit 603 has a function of modulating/demodulating an analog signal to a digital signal. The RF unit 603 includes a synthesizer, and controls bands and channels based on frequency assignment data by identifying the frequencies of the bands and channels. The transmission/reception control unit 604 executes control associated with transmission/reception, such as assembling and disassembling of a transmission/reception frame, appending and detection of a preamble, and identification of a frame. The transmission/reception control unit 604 also controls the NFC memory 605 to read/write various data and programs. When the NFC unit operates in the active mode, it receives power via the power supply 606 to communicate with a device via the device connecting unit 607 and communicate with another NFC device located within a communicable range by carriers transmitted/received via the antenna unit 602. When the NFC unit operates as a target in the passive mode, it receives carriers from another NFC device via the antenna to receive power from the other NFC device by electromagnetic induction, and transmits/receives data by performing communication with the other NFC device by modulating the carriers. Therefore, the target in the passive mode can wirelessly communicate with the initiator even if no power is supplied from a battery, an AC power supply, or the like.

Data names and data structures to be used in this embodiment will now be described with reference to FIGS. 13A and 13B.

Figure 13A:
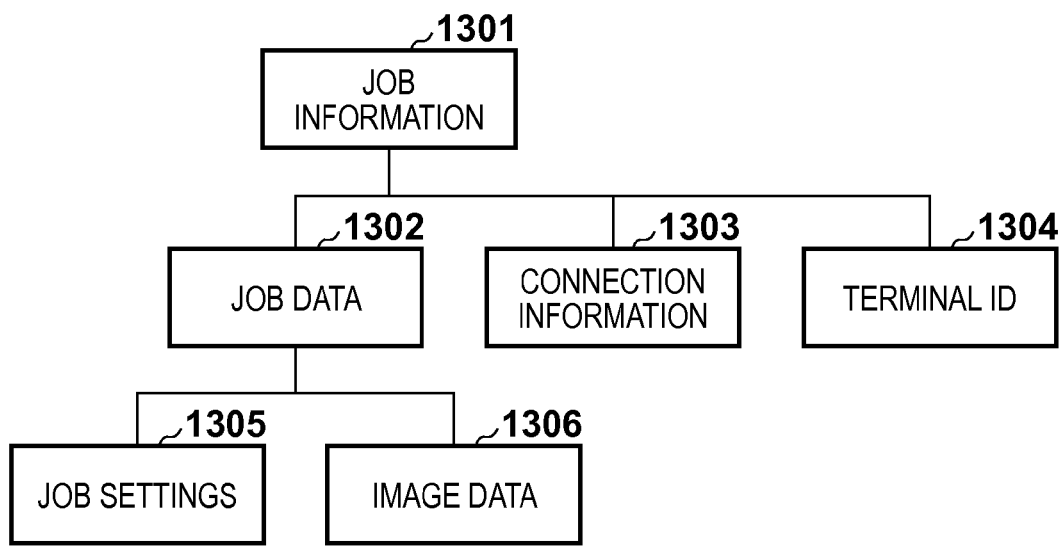
FIGS. 13A and 13B are views showing the structures of job information and connection information, respectively.

FIG. 13A shows the structure of job information transmitted from the mobile communication terminal apparatus 200 to the MFP 300. Job information 1301 includes job data 1302, connection information 1303, and a terminal ID 1304. The job data 1302 include job settings 1305 and image data 1306. A job type is written in the job data 1302. For example, a print job, scan job, fax job, or the like is designated. Print setting information is described as the job settings 1305. For a print job, for example, a paper sheet setting, print mode setting, paper feed tray setting, paper discharge tray setting, imposition setting, color setting, "number of copies" setting, magnification setting, user setting, and the like are described. For a scan job, a resolution setting, reading mode setting, save destination setting, save destination password, and the like are described. For a fax job, a transmission number, transmission image quality setting, broadcast setting, retransmission setting, and the like are described. The image data 1306 stores an image to be used in the job. For a print job, for example, image data to be printed is stored. For a fax job, fax data to be transmitted is stored. Note that the image data 1306 may be any of various kinds of print target data such as bitmap data, vector data, and text data.

The terminal ID 1304 is an ID for uniquely specifying a terminal which has transmitted the job. Any number which allows the mobile communication terminal apparatus 200 and the MFP 300 to uniquely identify the terminal may be used. For example, the serial number of the terminal may be used, or when the terminal is a mobile phone, a telephone number may be used. Using the terminal ID 1304, it is determined whether the mobile communication terminal apparatus which has transmitted the job is the same as that which is to be charged.

Figure 13B:
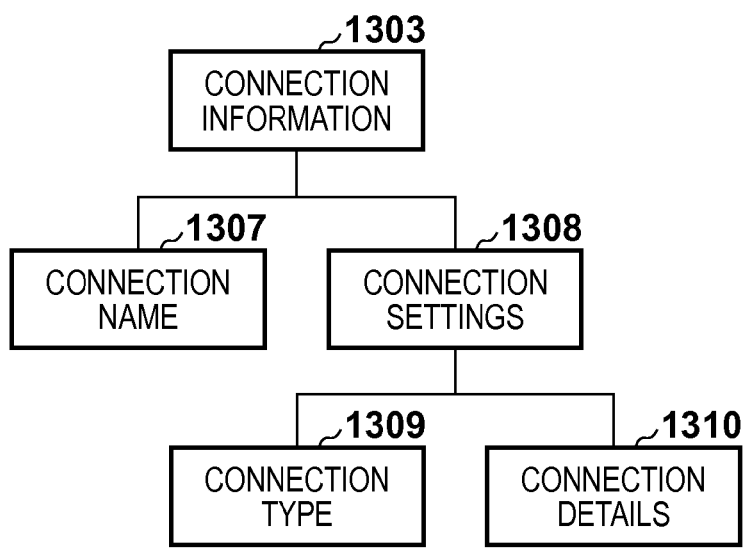

The connection information 1303 indicates connection information for a handover, which is to be used for the job, and has a structure shown in FIG. 13B. The connection information 1303 includes a connection name 1307 and connection settings 1308. The connection name 1307 is a unique name used by the user to identify a connection, and can be arbitrarily set by the user. The connection settings 1308 are data necessary for a handover, and include a connection type 1309 and connection details 1310. A communication method of performing a handover is written as the connection type 1309. For example, WLAN or Bluetooth is designated. The connection details 1310 are pieces of information for actually performing connection by WLAN or Bluetooth. For example, if WPS (Wi-Fi Protected Setup) is used for WLAN connection, WPS Credential authentication information is stored. When connecting to a smartphone by Bluetooth, GOB authentication information is stored. When connecting to a server apparatus via a LAN, network information such as the server name and IP address of the server apparatus is stored.

A case in which image data is directly transmitted from the mobile communication terminal apparatus 200 to the MFP 300 and a case in which the MFP 300 acquires job settings and image data from the mobile communication terminal apparatus 200 by a handover after receiving connection information will be described. In the case of the direct transmission, the apparatus transmits not the connection information 1303 but the job data 1302, job settings 1305, and image data 1306. To the contrary, in the case of the handover, only the location (storage location) of the job in the connection destination is described in the job data, and the apparatus transmits not the job settings 1305 and the image data 1306 but the connection information 1303. In either case, the terminal ID 1304 is transmitted.

Figure 7:
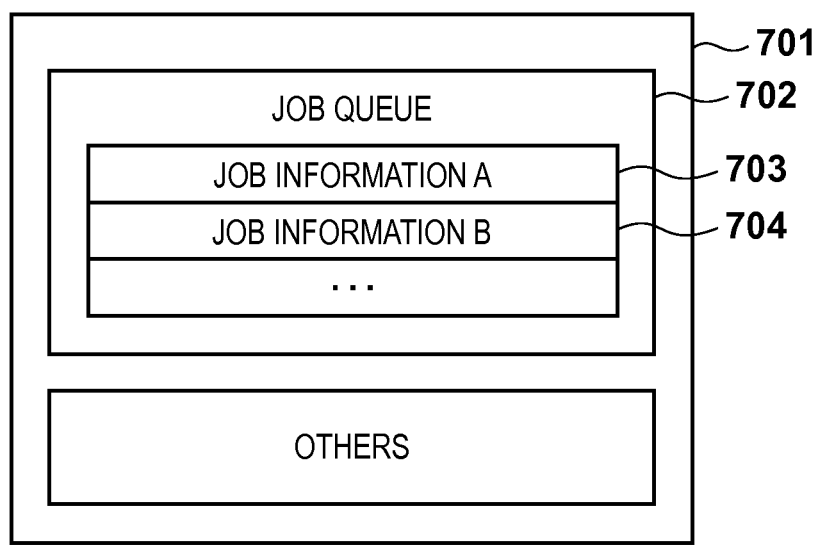
FIG. 7 is a view showing the structure of an NFC memory of the MFP.

FIG. 7 is a view showing the data structure of the NFC memory 605 within the NFC unit 517 of the MFP 300. Job information transmitted by the mobile communication terminal apparatus 200 is stored in a job queue 702 of an NFC memory 701. The reason why the job queue is used is because the user may execute a job immediately after transmitting the job, or the user may execute jobs after transmitting a given number of jobs. Furthermore, the user can transmit a job during a power-off mode or power saving mode, and can thus transmit a plurality of jobs during the activation time of the MFP. If a job is transmitted during the power-off mode or power saving mode, it takes time for the MFP to enter a standby status since it is activated from the power-off mode or power saving mode. This can be a large factor which causes the user to leave the MFP 300 after transmitting a job.

Figure 8:
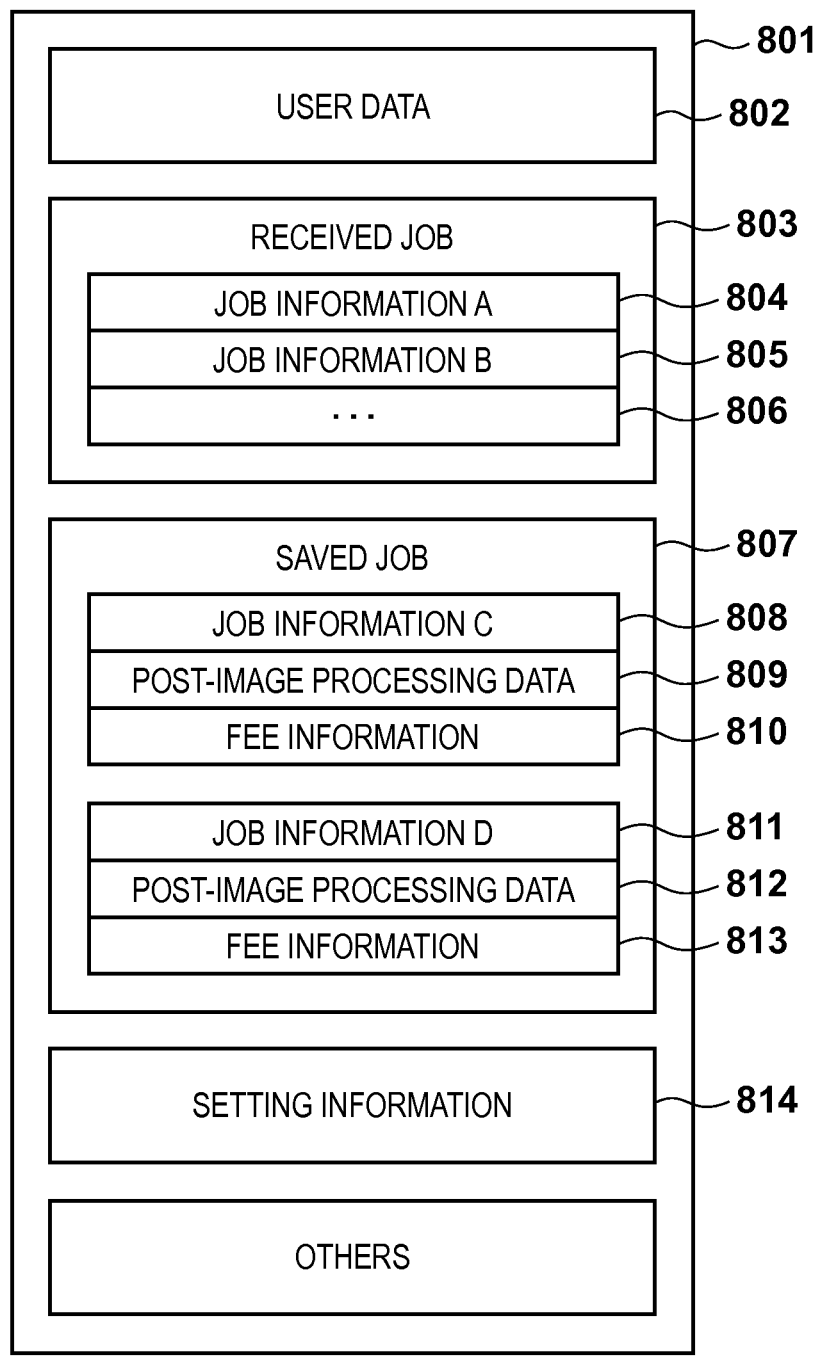
FIG. 8 is a view showing the structure of a nonvolatile RAM of the MFP.

FIG. 8 is a view showing the structure of the nonvolatile memory 505 of the MFP 300. A flash memory or the like is used as the nonvolatile memory. Reference numeral 801 denotes a nonvolatile memory as a whole. User data 802 stores information about the user, such as print setting information, FAX number, communication history, and network information. A received job 803 stores a job received via the job queue 702. A saved job 807 stores a job which is in a printing standby status and is temporarily saved to execute other jobs since processing has started but charging is not complete. Job information C 808 is an example of a saved job, and holds information corresponding to the job information 1301. Post-image processing data 809 stores data after the MFP 300 executes image processing for printing. Fee information 810 stores a fee calculated after the image processing is executed. Setting information 814 stores nonvolatile information necessary for the operation of the MFP 300.

Figure 9:
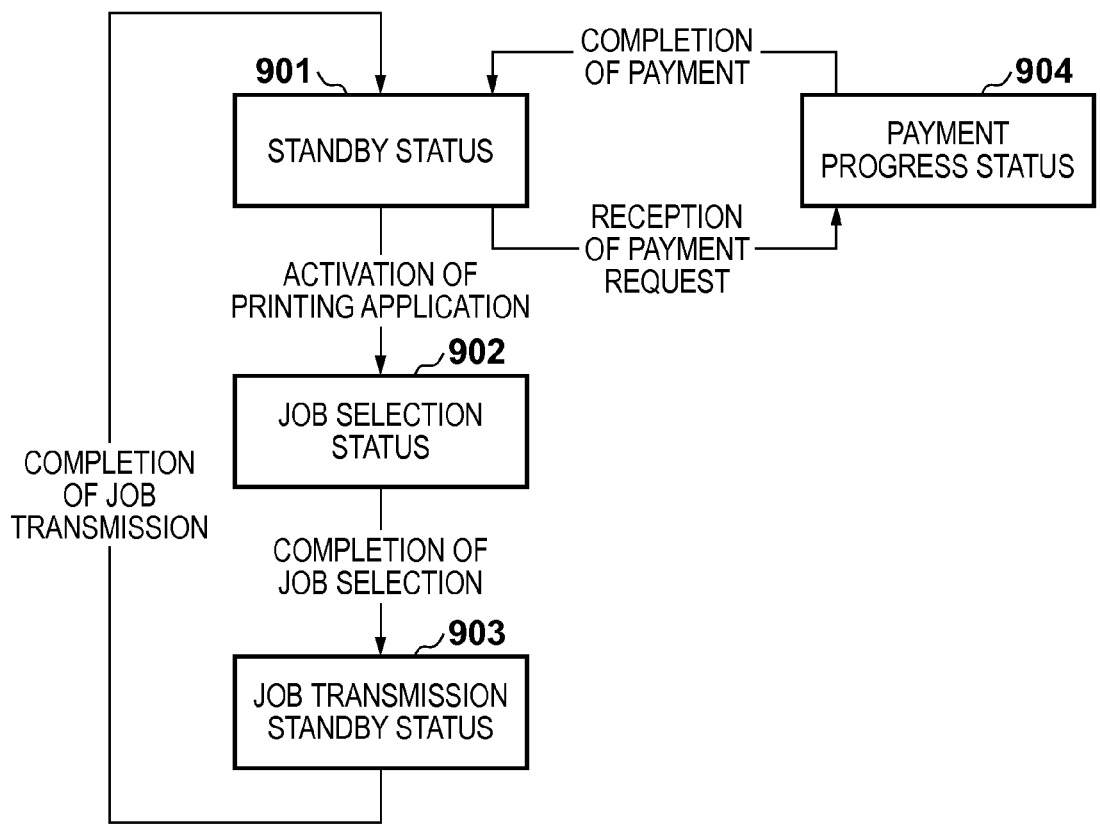
FIG. 9 is a view showing status transition of the mobile communication terminal apparatus.

FIG. 9 is a view showing status transition when the mobile communication terminal apparatus 200 transmits a job and performs charging processing. When, in a standby status 901, the user activates a printing application, the apparatus transits to a job selection status 902. When, in the job selection status 902, the user selects a desired document or image to be printed, selects job settings such as a print mode, image quality, and size, and completes all settings, the apparatus transits to a job transmission standby status 903. In the job transmission standby status 903, the mobile communication terminal apparatus 200 can transmit a job to the MFP 300 using the NFC unit 418. In the standby status 901 and the job selection status 902, the NFC unit serves as a target. However, in the job transmission standby status 903, the NFC unit serves as an initiator. When the UNC unit becomes an initiator, it enters a mode in which it generates an RF field to search for a communication partner. At this time, by touching the NFC unit 306 of the MFP 300, the apparatus can transmit a job. Upon completion of transmission of the job, the apparatus returns to the standby status 901. Upon receiving a payment request from the MFP 300 in the standby status 901, the apparatus transits to a payment progress status 904. At this time, the MFP 300 serves as an initiator to search for a payment terminal. When the user touches the MFP 300 with the mobile communication terminal apparatus 200 which is in the standby status 901, the mobile communication terminal apparatus 200 serves as a target to transit to the payment progress status 904. Upon completion of payment in the payment progress status 904, the apparatus transits to the standby status 901. Making payment indicates that after the mobile communication terminal apparatus 200 and the MFP 300 establish communication according to a predetermined sequence, the fee of the payment request from the MFP 300 is deducted from electronic money charged in advance in the mobile communication terminal apparatus 200, and the MFP 300 notifies the mobile communication terminal apparatus 200 of completion of payment.

FIG. 10 is a view showing status transition from when the MFP 300 receives a job to execute image processing, and charges for the job until printing is completed. In a standby status 1000 as a communication standby status, the MFP 300 serves as a target, and stands by for reception of a job. Upon receiving a job from the mobile communication terminal apparatus 200 serving as an initiator, the MFP transits to a job reception progress status 1001. In the job reception progress status 1001, the job is received while the mobile communication terminal apparatus 200 operates as an initiator and the MFP 300 operates as a target. At this time, the MFP 300 stores and holds the ID of the mobile communication terminal apparatus 200 in the memory. If the job transmission method is the above-described direct transmission, the MFP transits to an image processing progress status 1003 upon completion of job reception. If the job transmission method is the above-described handover, the MFP transits to a handover progress status 1002. A handover transmission sequence will be described later with reference to FIG. 12. It may take a predetermined time to perform the handover. Upon completion of transmission by the handover, the MFP transits to the image processing progress status 1003. In the image processing progress status 1003, image processing is executed to convert the received job data into data to be printed. If, for example, the print job is described in the PDL (Page Description Language), rendering processing is executed to generate raster data. If font data is embedded, a font image is generated in a desired form. If imposition is set, desired imposition (for example, 2in1 or 4in1) is performed. If color management is set, desired color conversion is performed. If rotation and enlargement/reduction are set, desired conversion is performed. It may take time to execute image processing depending on the number of pages to be printed and image processing settings. Upon completion of the image processing, the MFP transits to a fee calculation progress status 1004. In the fee calculation progress status 1004, a fee required for printing is calculated. Upon completion of calculation, the MFP transits to a payment standby status 1005.

In the payment standby status 1005, the MFP 300 serves as an initiator, and stands by for a touch by a mobile communication terminal apparatus. At this time, there are four branches of status transition depending on the type and status of the touching mobile communication terminal apparatus. That is, the MFP transits to one of the four statuses according to the combination of a condition whether the touching mobile communication terminal apparatus is the same as that which has transmitted the job, and a condition whether the mobile communication terminal apparatus is in the job transmission standby status. Details will be explained with reference to a sequence shown in FIGS. 11A and 11B. If the same terminal is used to make payment, the MFP starts printing, and transits to a printing progress status 1006. Upon completion of the printing, the MFP returns to the standby status 1000. If the same terminal transmits a job, the MFP interrupts the payment standby status to return to the job reception progress status 1001. If another terminal is used to make payment, the MFP transits to a payment disable display 1007, notifies the user that payment is impossible, and then transits to the payment standby status 1005 after a predetermined period of time. If another terminal transmits a job, the MFP temporarily interrupts the current job, and transits to an interruption processing progress status 1008. To receive a job from the other terminal, the MFP transits to the job reception progress status 1001.

A procedure of transmitting a job, charging for the job, and executing printing while the mobile communication terminal apparatus 200 and the MFP 300 actually communicate with each other will be described with reference to flowcharts shown in FIGS. 11A and 11B. Note that the mobile communication terminal apparatus 200 and the MFP 300 execute processing according to the flowcharts shown in FIGS. 11A and 11B. More specifically, the ROM 403 of the mobile communication terminal apparatus 200 and the ROM 503 of the MFP 300 store programs corresponding to the processing of FIGS. 11A and 11B. When the CPUs 402 and 502 execute the programs on the RAMs 404 and 504, respectively, it is possible to implement the processing according to the flowcharts shown in FIGS. 11A and 11B.

This procedure starts in step S1100, and advances to step S1101. In step S1101, the mobile communication terminal apparatus 200 activates a printing application, and generates a print job. More specifically, the apparatus displays, for example, a list of images captured by the camera unit 411 on the display unit 410, and prompts the user to select an image to be printed. Furthermore, a desired print mode is selected, and one of the direct transmission and the handover is selected as a transmission method. This procedure corresponds to the sequence of selecting a job by transiting from the standby status 901 to the job selection status 902 in FIG. 9. Upon completion of generation of the print job, the process advances to step S1102. In step S1102, the mobile communication terminal apparatus 200 transmits the print job to the MFP 300 by NFC. More specifically, the mobile communication terminal apparatus 200 transmits the print job by operating as an initiator of NFC, and touching the NFC unit 306. Since the terminal ID 1304 is transmitted at the time of transmission, the MFP 300 can uniquely identify the mobile communication terminal apparatus 200. Upon completion of transmission of the job, the process advances to step S1103.

In step S1103, the MFP 300 analyzes the print job, and determines whether the transmission method is the direct transmission or handover. If the image data 1306 has been sent, the transmission method is the direct transmission. On the other hand, if the connection information 1303 has been written, the transmission method is the handover. If the transmission method is the handover, the process advances to step S1104; otherwise, the process advances to step S1105. Details of step S1104 will be described later with reference to FIG. 12, and will be omitted here.

In step S1105, since information and data necessary for printing are all prepared, the MFP 300 starts image processing. Processes in steps S1105 and S1106 are the same as those in the image processing progress status 1003 and the fee calculation progress status 1004, and a description thereof will be omitted. In step S1107, the MFP transits to the payment standby status. In this status, the fee is displayed on the display unit 511, thereby prompting for payment by touching the MFP with the mobile communication terminal apparatus 200. Since the NFC unit of the MFP 300 serves as an initiator, it can recognize that the mobile communication terminal apparatus 200 serving as a target touches the MFP. If the mobile communication terminal apparatus 200 touches the MFP, the process advances to step S1108.

In step S1108, the MFP detects whether the touching mobile communication terminal apparatus 200 serves as an initiator or target. If the mobile communication terminal apparatus 200 serves as an initiator, NFC communications collide with each other, and thus the MFP returns to a target, and starts communication with the mobile communication terminal apparatus 200 serving as an initiator. In this case, the mobile communication terminal apparatus 200 transmits a job, and thus the process advances to step S1113.

On the other hand, if the touching mobile communication terminal apparatus 200 serves as a target, it transits to the payment progress status 904, and starts a payment application, thereby advancing to step S1109. In step S1109, it is determined whether the terminal ID of the mobile communication terminal apparatus 200 which has touched the MFP in step S1108 matches that of the mobile communication terminal apparatus 200 of the transmitted job, which has been received from the MFP 300 in step S1102. If the terminal IDs match, the process advances to step S1111 to execute charging processing. The process advances to step S1112 to execute printing, and then advances to step S1118 to terminate the sequence.

If the terminal IDs do not match, the process advances to step S1110 to display, on at least one of the display units of the mobile communication terminal apparatus 200 and the MFP 300, information indicating that payment is impossible because the mobile terminal apparatus which has transmitted the job is different from that which is to make payment. After a predetermined period of time, the process returns to step S1107.

In step S1111, fee information corresponding to the terminal ID of the mobile communication terminal apparatus 200 which has touched the MFP in step S1108 is read out from the nonvolatile memory 505, thereby executing the charging processing according to the fee information. If, therefore, there are a plurality of mobile communication terminal apparatuses which are in the payment standby status, it is possible to charge an appropriate fee.

In step S1113, the same determination processing as that in step S1109 is performed. If the terminal IDs match, the MFP has received an additional job, and interrupts the payment standby status to return to step S1103. If the terminal IDs do not match, the process advances to step S1114. In step S1114, a print job currently in the payment standby status is temporarily saved. More specifically, job information, post-image processing data, and fee information are saved in the memory described with reference to the saved job 807. This makes it possible to quickly return the saved job after another job is executed.

Upon completion of saving in step S1114, the process advances to step S1115 to execute another job. Upon completion of execution of the other job, the process advances to step S1116. In step S1116, the job saved in step S1114 is returned from the saved job 807, and then the process advances to step S1107. Note that the processing in step S1115 is the same as that in steps S1103 to S1118.

Figure 11A:
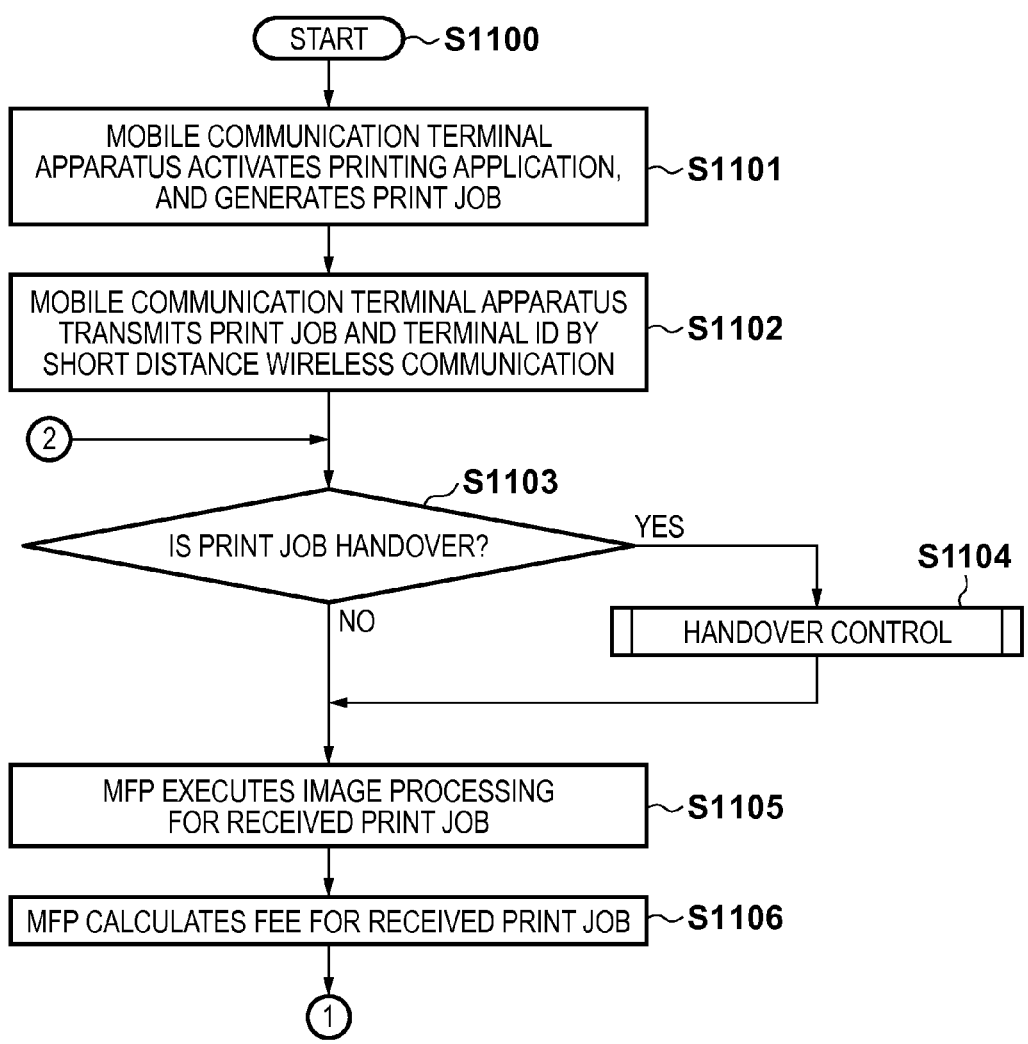

In the above-described processing shown in FIGS. 11A and 11B, in the payment standby status, the job is processed as an additional job in step S1117 with respect to an apparatus which has already received a job and is in the payment standby status. On the other hand, if a print job is received from an apparatus which is not in the payment standby status, the print job is processed as another job. The process in step S1114 or S1117 can be executed for a plurality of apparatuses and a plurality of jobs, and it is possible to save, as jobs in the payment standby status, a plurality of jobs received from a plurality of apparatuses in the nonvolatile memory of the MFP 300.

Charging processing and printing can be executed from a job corresponding to an apparatus which has touched the MFP for payment.

FIG. 12 shows a handover sequence of transferring data by switching between NFC and WLAN. The processes described with reference to the handover progress status 1002 and step S1104 will be explained in detail. The communication speed of NFC is as relatively low as several hundred bps. Efficient data transfer can therefore be implemented by performing authentication or the like by NFC, and transmitting a large amount of data by higher-speed WLAN. A case in which the handover destination is the mobile communication terminal apparatus itself will be described with reference to FIG. 12.

In step S1201, to establish NFC communication, an NFC communication unit 1203 of a mobile communication terminal apparatus 1201 serves as an initiator, and detects an NFC communication unit 1205 of an MFP 1202 as a target. If the NFC communication unit 1205 is accurately detected, it transmits a detection response in step S1202. Note that FIG. 12 shows a case in which the mobile communication terminal apparatus 1201 serves as an initiator. In fact, however, the MFP 1202 may serve as an initiator based on an input from the operation display unit 305 or the like. If the detection response is accurately received, in step S1203 the NFC communication unit 1203 transmits an attribute request for performing NFC communication. Upon receiving the attribute request, the NFC communication unit 1205 returns an attribute response in step S1204. At the time of transmitting the attribute request and the attribute response, the NFC IDs of the initiator and the target are transmitted, thereby specifying communication partners based on these IDs.

In step S1205, mutual authentication is executed, and an encryption key or the like for data encryption can be transferred. Note that if it is not necessary to transfer an encryption key, mutual authentication need not be performed. In step S1206, a print job is transmitted. When transmitting the print job, an access key to the mobile communication terminal apparatus can be included in the job and transmitted to perform authentication based on the access key upon a handover via WLAN, thereby enhancing security. In step S1207, the NFC communication unit 1203 transmits a release request.

Upon receiving the release request, the NFC communication unit 1205 transmits a release response in step S1208, thereby terminating the NFC communication.

The process advances to step S1209, a WLAN communication unit 1206 issues a connection request to a WLAN communication unit 1204. At this time, authentication is performed using the access key received in step S1206 to return a connection response in step S1210, thereby establishing a WLAN connection. In step S1211 and subsequent steps, WLAN communication is performed. In step S1211, the WLAN communication unit 1206 requests image data, and confirms with the WLAN communication unit 1204 whether data transfer is possible. In this case, contents to be confirmed are, for example, a free space for temporarily saving an image to be transferred to the MFP 1202. If the WLAN communication unit 1204 can transmit image data upon receiving the image data request and confirmation request, it transmits the image data in step S1212. Upon normally receiving the image, the NFC communication unit 1205 transmits a disconnection request in step S1213. In response to this, the WLAN communication unit 1204 returns a disconnection response in step S1214, thereby terminating the communication. The MFP 1202 may transmit the disconnection request in step S1213 at the timing after the end of printing or before printing. If the communication is disconnected after the end of printing, the printing status can be sent. If the communication is disconnected before the end of printing, the power consumption and communication amount can be saved. As described above, a large amount of data can be transferred using a higher-speed communication protocol.

Although the mobile communication terminal apparatus 1201 is set as the handover destination in FIG. 12, an arbitrary image storage destination such as a server apparatus 1207 may be designated. A sequence in that case is the same except for the connection destination in step S1209 and subsequent steps and a description thereof will be omitted. The handover of performing data transfer by switching the communication from NFC to WLAN has been explained above. In the status transition of the MFP shown in FIG. 10, this processing corresponds to the job reception progress status 1001. Therefore, the MFP generates bitmap image data for print processing from information to be actually printed, and calculates a fee based on a printing paper size, color/monochrome, number of pages, number of copies, and the like, thereby transiting to the payment standby status 1005. At this time, the MFP communicates with a mobile communication terminal apparatus again, and executes one of the above-described four processes depending on the terminal ID of the mobile communication terminal apparatus as the communication partner.

Second Embodiment

FIG. 14 shows an example obtained by further developing the view of FIG. 10 showing status transition of the MFP according to the above-described first embodiment. The substantially same statuses as those shown in FIG. 10 have the same reference numerals and a description thereof will be omitted.

In the transition view of FIG. 14, when transiting to a payment standby status 1005' to perform a payment procedure upon completion of calculation of a fee for a received job, the status (also an initiator status) lasts for at most a predetermined period of time (30 sec in this example). If a mobile communication terminal apparatus having the same ID as that of a mobile communication terminal apparatus which has requested the latest job issues a payment instruction during the period of time, the MFP executes print processing, and then executes charging processing. On the other hand, if the mobile communication terminal apparatus having the ID as that of the mobile communication terminal apparatus which has requested the latest job requests an additional job within the period of time, the MFP transits to a job reception progress status 1001.

In the payment standby status 1005', a period of 30 sec may elapse without receiving a payment instruction from the mobile communication terminal apparatus having the same ID as that of the mobile communication terminal apparatus which has requested the latest job, or a mobile communication terminal apparatus having an ID different from that of the mobile communication terminal apparatus which has requested the latest job may be detected. In this case, the MFP transits to an interruption processing progress status 1008, and executes saving processing by associating, with the ID, image data, print setting information, and a calculated fee for printing a job in the payment standby status. After that, the MFP transits to a standby status 1000. When the MFP detects a mobile communication terminal apparatus having an ID different from that of the mobile communication terminal apparatus which has requested the latest job, and transits to the standby status, if the request is a print job request, the MFP considers the print job as a new print job, and transits to the job reception progress status 1001.

On the other hand, if the request is a payment request, the MFP searches jobs saved in the past for an unpaid job (unprinted job) having the same ID as that of the issuance source of the request (a saved job search status 1010). If it is determined that no unpaid job is found, the MFP transits to a payment disable display 1011, and then returns to the standby status after displaying, for 5 sec, a message indicating that no corresponding job exists. On the other hand, if it is determined that an unpaid job (unprinted job) having the same ID as that of the request source is found among the jobs saved in the past, the MFP reads out the saved image data, print setting information, and calculated fee immediately before printing, thereby transiting to the payment standby status 1005'. At this time, the readout image data and calculated fee are equally processed when transiting from a status 1004. That is, the latest job is processed as a readout job.

According to the above-described second embodiment, only if a fee is displayed, and communication is made with the mobile communication terminal apparatus of a user who intends to pay the fee, it is possible to obtain the result of the payment (charging processing) and printing. Note that when issuing a payment request to obtain a print material of a print job which has been requested and saved in the past, the user makes his/her own mobile communication terminal apparatus function as an initiator, and then activates a payment application. If this is done in the status 1005', the mobile communication terminal apparatus and the MFP serve as initiators, and collide with each other, and thus one of them functions as a target. In this case, the MFP may directly transit from the status 1005' to the status 1010.

According to this embodiment, therefore, if transmission of a print job and charging processing are sequentially performed using a mobile communication terminal apparatus (mobile terminal), it can be determined whether the apparatus which has transmitted the print job is the same as that which performs communication for charging. Consequently, it is possible to decrease the probability that, for example, a third party carries a printing material away by performing charging processing by another apparatus, and executing printing after transmission of a print job.

In this embodiment, after transmitting a job using a mobile communication terminal apparatus, an additional job is accepted from the same mobile communication terminal apparatus in a charging standby status. Charging processing is executed after a touch for payment. It is, therefore, possible to collectively charge for a plurality of jobs.

Furthermore, in this embodiment, even if a given mobile communication terminal apparatus is in the charging standby status, another apparatus can transmit a print job. For example, therefore, even if the user forgets payment and leaves, another user can execute printing.

In this embodiment, when a mobile communication terminal apparatus and an MFP 300 perform wireless communication, it is determined whether the mobile communication terminal apparatus performs charging processing or transmits a print job. The MFP 300 operates according to the determination result. It is, therefore, possible to prevent charging processing from being erroneously executed for an apparatus which transmits a print job.

In addition, in this embodiment, to determine whether the mobile communication terminal apparatus performs charging processing or transmits a print job, a condition whether the NFC unit of the mobile communication terminal apparatus serves as a target or initiator is used. The MFP 300 can appropriately determine processing which the mobile communication terminal apparatus wants the MFP 300 to execute, without transmitting a special command to designate processing (print job transmission or charging processing) desired by the mobile communication terminal apparatus to the MFP 300.

Note that in the above example, it is determined based on a terminal ID stored in advance in the mobile communication terminal apparatus whether an apparatus which has transmitted a print job is the same as that to be charged. The present invention, however, is not limited to this. For example, the user may input a password or personal identification number to the mobile communication terminal apparatus at the time of transmission of a print job, and the MFP 300 may receive the password or personal identification number in step S1102. Then, when touching the MFP for charging processing, the user inputs the password or personal identification number to the mobile communication terminal apparatus. The MFP 300 can determine whether the user who has transmitted the print job is the same as that who has issued the charging request by comparing the password or personal identification number received at the time of transmission of the print job with that received at the time of communication for charging processing.

This allows, for example, the same user to print an image stored in a given mobile communication terminal apparatus, and to perform charging processing using another mobile communication terminal apparatus.

Although a case in which print target data is included in a print job has been described in the above embodiment, the present invention is not limited to this. For example, the storage location (for example, the URL of an external server) of the print target data may be included in the print job. Upon receiving the print job, the MFP may access the external server via a network according to the URL to receive the print target data from the external server.

In the above embodiment, a case in which wireless communication units used to perform communication by BT, NFC, WLAN, and the like, respectively, are arranged as internal units of each of a mobile terminal apparatus and a printing apparatus has been explained. The present invention, however, is not limited to this. The above-described wireless communication units may be connected to the mobile terminal apparatus and printing apparatus as external units, and these apparatuses may control the external wireless communication units.

Furthermore, the printing apparatus in the above embodiment may be implemented in, for example, an external apparatus such as a personal computer connected with the printing apparatus.

Instead of charging processing of a fee for printing in the above embodiment, another processing may be performed. For example, storage processing of storing a print history in the mobile terminal apparatus may be executed. In this case, the printing apparatus receives the ID of the mobile terminal apparatus or the ID of the user of the apparatus, and controls print processing and the above-described storage processing based on the received ID.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137478, filed Jun. 28, 2013, which is hereby incorporated by reference herein in its entirety.

What is claimed is:

1. A printing control apparatus for controlling a first near field communication (NFC) unit which performs communication via near field communication (NFC), comprising:
a memory configured to store a program;
a processor configured to execute the program stored in the memory,
wherein the processor receives a first ID information for specifying a communication terminal or a user of the communication terminal, from a second near field communication (NFC) unit of the communication terminal by the first NFC unit at a first time, and receives first print target data from the communication terminal based on the NFC by the first NFC unit, and
wherein the processor determines, in a case where the second NFC unit of the communication terminal corresponding to second ID information is detected by the first NFC unit at a second time when the first ID information has been received and charging processing for a printing of the first print target data have not been performed, whether the communication terminal requests either another printing of a second print target data or the charging processing, based on whether the second NFC unit of the communication terminal serves as an initiator of the NFC or a target of the NFC, and wherein the processor performs the charging processing using the first NFC unit, after a predetermined image processing for the first print target data and before the printing of the first print target data, and performs the printing of the first print target data for which the predetermined image processing has been executed in response to completion of the charging processing, on a condition that it is determined that the communication terminal requests the charging processing and the second ID information received by the detection at the second time corresponds to the first ID information.

2. The apparatus according to claim 1, wherein
on a condition that it is determined that the communication terminal requests the other printing of the second print target data and the second ID information corresponds to the first ID information, the second print target data received from the communication terminal corresponding to the second ID information, is processed as additional print target data for the charging processing for the printing of the first print target data.

3. The apparatus according to claim 2, wherein
on a condition that it is determined that the communication terminal requests the other printing of the second print target data and the second ID information does not correspond to the first ID information, the second print target data received from the communication terminal corresponding to the second ID information, is printed without the charging processing for the printing of the first print target data.

4. The apparatus according to claim 3, wherein on a condition that it is determined that the communication terminal requests the charging printing and the second ID information does not correspond to the first ID information, information indicating that the charging processing is not performed, is transmitted from the first NFC unit to the NFC unit of the communication terminal corresponding to the second ID information.

5. The apparatus according to claim 1, wherein in a case where the processor receives a plurality of pieces of ID information from a plurality of communication terminals, and the communication terminal corresponding to the second ID information is detected by the first NFC unit at the second time based on the second ID information corresponding to the communication terminal among the plurality of pieces of ID information, the processor performs the printing of print target data corresponding to the second ID information.

6. The apparatus according to claim 1, wherein in a case where the second NFC unit of the communication terminal corresponding to the second ID information serves as the initiator of the NFC, the processor determines that the communication terminal requests the other printing of the second print target data, and in a case where the second NFC unit of the communication terminal corresponding to the second ID information serves as the target of the NFC, the processor determines that the communication terminal requests the charging processing.

7. The apparatus according to claim 6, wherein the first NFC unit serves as the target of the NFC when the processor receives the first ID information, and then the first NFC unit serves as the initiator of the NFC after the printing apparatus processor executes the predetermined image processing for the first print target data.

8. The apparatus according to claim 7, wherein the processor executes the predetermined image processing, and then calculates fee to be charged by the charging processing based on the predetermined image processing, and then the first NFC unit serves as the initiator of the NFC.

9. The apparatus according to claim 1, wherein communication information for establishing a wireless communication which is different from the NFC, is communicated between the first NFC unit and the second NFC unit, and the processor receives the first print target data via the wireless communication established based on the communication information.

10. A communication method for a communication terminal and a printing apparatus by communication via near field communication (NFC), comprising:
a reception step of causing the printing apparatus to receive first ID information for specifying the communication terminal or a user of the communication terminal, from a second near field communication (NFC) unit of the communication terminal by a first near field communication (NFC) unit at a first time, and to receive first print target data, from the communication terminal based on the NFC;
a determining step of causing the printing apparatus to determine, in case where the second NFC unit of the communication terminal corresponding to second ID information is detected by the first NFC unit at a second time when the first ID information has been received and charging processing for a printing of the first print target data have not been performed, whether the communication terminal requests either another printing of second print target data or the charging processing, based on whether the second NFC unit of the communication terminal serves as an initiator of the NFC or a target of the NFC,
an execution step of causing the printing apparatus to execute the charging processing using the first NFC unit, after a predetermined image processing for the first print target data and before the printing of the first print target data, and
to execute the printing of the first print target data for which the predetermined image processing has been executed, in response to completion of the charging processing, on a condition that it is determined that the communication terminal requests the charging processing and the second ID information received by the detection at the second time corresponds to the first ID information.

11. The method according to claim 10, wherein, on a condition that it is determined that the communication terminal requests the other printing and the second ID information corresponds to the first ID information, the second print target data received from the communication terminal corresponding to the second ID information, is processed as additional print target data for the charging processing for the printing of the first print target data.

12. The method according to claim 11, wherein, on a condition that it is determined that the communication terminal requests the other printing of the second print target data and the second ID information does not correspond to the first ID information, the second print target data received from the communication terminal corresponding to the second ID information, is printed without the charging processing for the printing of the first print target data.

13. The method according to claim 12, wherein, on a condition that it is determined that the communication terminal requests the charging printing and the second ID information does not correspond to the first ID information, information indicating that the charging processing is not performed, is transmitted from the first NFC unit to the NFC unit of the communication terminal corresponding to the second ID information.

14. The method according to claim 10, wherein in a case where a plurality of pieces of ID information are received from a plurality of communication terminals in the reception step, and the communication terminal corresponding to the second ID information is detected via the first NFC unit at the second time, based on the second ID information corresponding to the communication terminal among the plurality of pieces of ID information, printing of print target data corresponding to the second ID information and the predetermined image processing for the printing are executed in the printing step.

15. The method according to claim 10, wherein, in a case where the second NFC unit of the communication terminal corresponding to the second ID information serves as the initiator of the NFC, it is determined in the determination step that the communication terminal requests the other printing of the second print target data, and in a case where the second NFC unit of the communication terminal corresponding to the second ID information serves as the target of the NFC, it is determined in the determination step that the communication terminal requests the charging processing.

16. The method according to claim 10, wherein, communication information for establishing a wireless communication which is different from the NFC, is communicated between the first NFC unit and the second NFC unit, and the printing apparatus receives the first print target data via the wireless communication established based on the first communication information.

17. The method according to claim 10, wherein the first NFC unit serves as the target of the NFC when the priming apparatus receives the first ID information, and then the first NFC unit serves as the initiator of the NFC after the priming apparatus executes the predetermined image processing for the first print target data.

18. The method according to claim 17, wherein the printing apparatus executes the predetermined image processing, and then calculates fee to be charged by the charging processing based on the predetermined image processing, and then the first NFC unit serves as the initiator of the NFC.

19. A printing apparatus for controlling a first near field communication (NFC) unit which performs communication via near field communication (NFC), comprising:
a memory configured to store a program;
a processor configured to execute the program stored in the memory,
wherein the processor receives first print target data from a communication terminal, based on the NFC established at a first time between the first NFC unit and a second near field communication (NFC) unit of the communication terminal, and
wherein the processor determines, in a case where the second NFC unit of the communication terminal is detected by the first NFC unit at a second time when the first print target data has been received and charging processing for a printing of the first print target data have not been performed, whether the communication terminal requests either another printing of second print target data or the charging processing, based on whether the second NFC unit of the communication terminal serves as an initiator of the NFC communication or a target of the NFC, and
wherein the processor performs the charging processing using the first NFC unit, and performs the printing of the first print target data in response to completion of the charging processing, on a condition that it is determined that the communication terminal requests the charging processing,
wherein the processor receives the second print target data based on the NFC established at second time between the first NFC unit and the second NFC unit of the communication terminal, on a condition that it is determined that the communication terminal requests the other printing.

20. A method for a printing apparatus for controlling a first near field communication (NFC) unit which performs communication via near field communication (NFC), comprising:
receiving first print target data from a communication terminal, based on the NFC established at a first time between the first NFC unit and a second near field communication (NFC) unit of the communication terminal;
determining, in a case where the second NFC unit of the communication terminal is detected by the first NFC unit at a second time when the first print target data has been received and charging processing for a printing of the first print target data have not been performed, whether the communication terminal requests either another printing of second print target data or the charging processing, based on whether the second NFC unit of the communication terminal serves as an initiator of the NFC or a target of the NFC;
performing the charging processing using the first NFC unit, and performing the printing of the first print target data in response to completion of the charging processing, on a condition that it is determined that the communication terminal requests the charging processing;
receiving the second print target data based on the NFC established at the second time between the first NFC unit and the second NFC unit of the communication terminal, on a condition that it is determined that the communication terminal requests the other printing.

* * * * *